Feb. 20, 1951 C. TIFFANY 2,542,594

SUPERSONIC COMMUNICATION SYSTEM

Filed May 13, 1946 3 Sheets-Sheet 1

INVENTOR.
CARTER TIFFANY.
BY
Ward, Crosby & Neal
ATTORNEYS.

SUPERSONIC COMMUNICATION SYSTEM

Filed May 13, 1946 3 Sheets-Sheet 2

INVENTOR.
CARTER TIFFANY.
BY Ward, Crosby & Neal
ATTORNEYS.

SUPERSONIC COMMUNICATION SYSTEM

Filed May 13, 1946 3 Sheets-Sheet 3

INVENTOR.
CARTER TIFFANY.
BY
Ward, Crosby & Neal
ATTORNEYS

Patented Feb. 20, 1951 2,542,594

UNITED STATES PATENT OFFICE 2,542,594

SUPERSONIC COMMUNICATION SYSTEM

Carter Tiffany, Englewood, N. J.

Application May 13, 1946, Serial No. 669,440

5 Claims. (Cl. 179—1)

This invention pertains to methods and apparatus for the transmission of intelligence by means of supersonic vibrations, i. e., acoustical vibrations which are above the range of audibility of the average person, for example, upwards of 25,000 cycles per second.

A primary object of the invention is to provide a system of supersonic communication such that information may be selectively transmitted to one or more individuals of a group, without detection by and to the exclusion of others in the group, and without interfering with the activities of such individuals or of the group. This is accomplished by placing the supersonic transmitting equipment in a location hidden from said group, and by providing the selected recipients with supersonic receiving and rectifying devices of novel construction, which take the outward form and dimensions of small units adapted to fit into the ear, similar in appearance to the hearing aid devices currently employed by persons of sub-normal hearing.

The invention is accordingly of special utility as a means of directing, instructing or coaching actors on stage before an audience or on stage in a sound motion picture production studio, or performing in radio and broadcasting and television studios, etc. Under such circumstances, the actors may proceed with their performances in accordance with instructions supersonically transmitted, and without detection of this fact by the audience or other observers, and without in any wise interfering with the sound and picture recordings in the case of motion picture studios, or interference to broadcasting activities or signals in the case of radio or television broadcasting performances. With respect to the latter applications, the microphones employed as pick-up devices of audible sounds in such studios are normally insensitive to supersonic vibrations, and are, moreover, linear devices which will not in and of themselves demodulate the supersonic vibrations. As a safeguard, in this respect, the output circuits of such microphone pick-up devices may be provided with low-pass electrical filters, which permit transmission of all vibrations within the audible range but suppress, and thus prevent, transmission of the supersonic vibrations. Thus, in accordance with the invention, verbal instructions may be given to actors on stage, without these instructions being transmitted to recording or broadcasting equipment. The supersonic rectifying and receiving devices, attached to the ears of the actors to be instructed, can be painted flesh color, covered with hair, or otherwise camouflaged, in such manner as to be substantially unobservable, and, furthermore, the direction of the production can be carried out in such manner as to divert attention from these inconspicuous ear devices.

Methods and apparatus in current use today for the transmission of intelligence, by means of supersonic vibrations take this approximate form: A generator of supersonic vibration is modulated in amplitude with the intelligence to be transmitted. At the receiving station, a pick-up device is employed, which ordinarily comprises a modified type of microphone, for converting the supersonic acoustical vibrations into electrical vibrations having the same general characteristics with respect to frequency of vibration and amplitude variations, as the received supersonic signals. The resulting electrical energy is heterodyned, at the receiver, by means of a local oscillator and converter, to a frequency in the audible range. In this way, the intelligence which had been introduced as modulation of the supersonic generator at the transmitting station, thus appears at the output terminals of an acoustical receiving device at the receiver, in essentially its original form. Suitable amplification of the electrical energy is usually employed in the receiving equipment. The indicators used thereat may be loud speakers, indicating or recording meters, etc., as desired.

In accordance with one aspect of my invention, I propose to use, as a supersonic receiving station, an electromechanical device for directly demodulating or rectifying the amplitude modulated supersonic waves. To this end, the receiving devices, in accordance with my invention, comprise the combination of a housing of Bakelite or other suitable material so shaped as to fit into the ear passage, and a piezo-electric diaphragm and a copper oxide or similar type of rectifier mounted in the housing. The rectifier is connected directly across the electrical terminals of the piezo-electric diaphragm. In construction, the housing is designed to be attached to the ear, in such manner that the sound effects received by the ear are largely transmitted from the air, in the form of supersonic vibrations, to the piezo-electric diaphragm, and thus relayed to the ear by the resultant air motion in the external ear passage. Due to the well-known piezo-electric effect in the crystal diaphragm, a voltage is developed on the faces of the crystal as the crystal is deformed mechanically by the action of the supersonic vibrations. When the diaphragm tends to move in one direction, current due to the voltage developed follows a low resistance electrical path through the rectifier, which tends to restrict the motion of the crystal in that direction. On the other hand, when the diaphragm tends to move in the opposite direction, under the influence of the supersonic wave motion, a voltage of opposite polarity is developed across the crystal terminals, but, owing to the unilateral action of the rectifier, a greatly reduced current flows through the rectifier, so that the motion of the crystal diaphragm in that direction is relatively free and unhindered. This non-linear response of the diaphragm thus transmits to the ear the modulation components of the modulated supersonic waves received, and hence is audible to the ear in essentially the same form as that of the original intelligence employed for modulating the supersonic waves at the transmitting station.

Having thus outlined, in general terms, the basic principles of the invention, reference will now be had to the accompanying drawings for a more detailed description of a preferred embodiment thereof, wherein:

Fig. 2 illustrates, in longitudinal or axial section, a supersonic transmitting device suitable for use as a supersonic loud speaker or broadcasting unit in the system of Fig. 1; while Fig. 3 is a perspective view of the piezo-electric diaphragm employed in the Fig. 2 construction.

Figures 1, 9, 10:
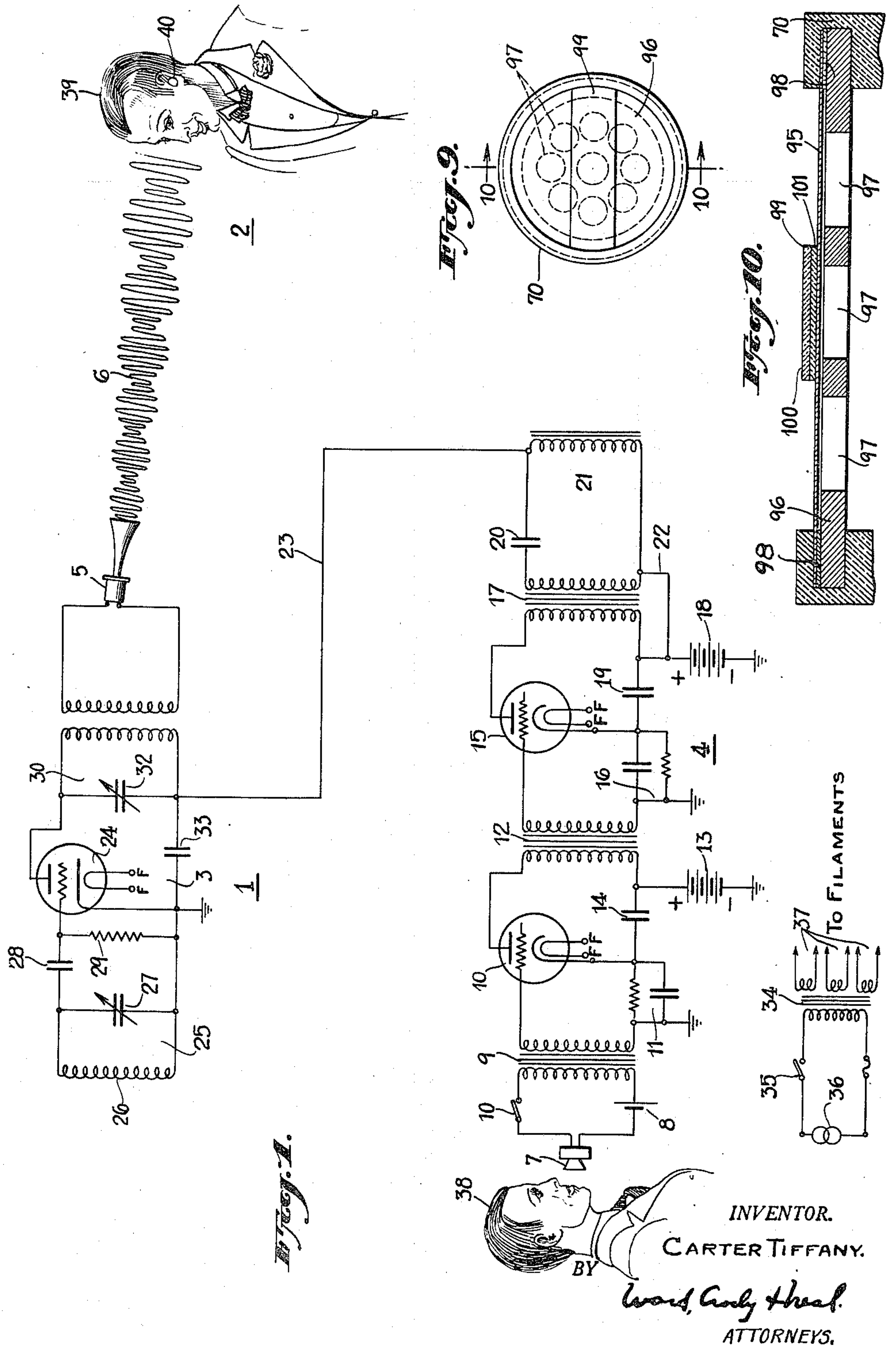
Figure 1 illustrates diagrammatically and partially in the form of an electrical circuit diagram, a complete system for the supersonic transmission and receipt of intelligence in accordance with the invention.
Figure 4:
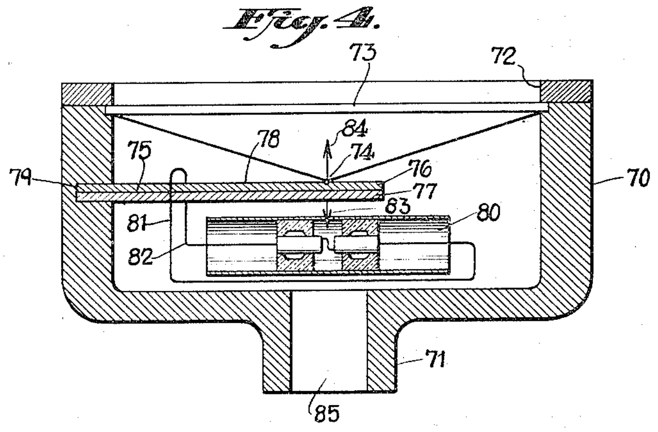
Figure 5:
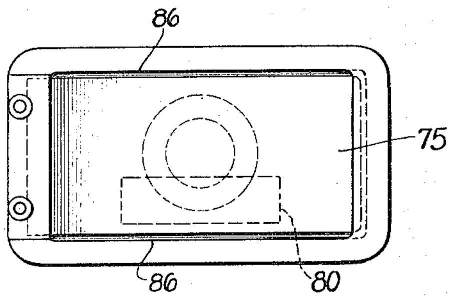
Figure 6:
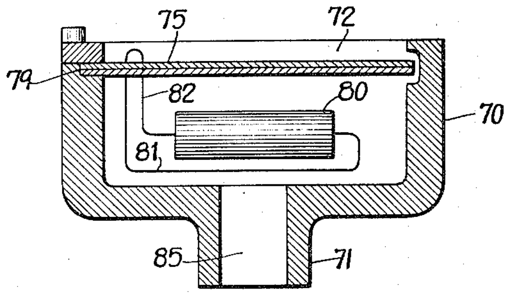
Figure 7:
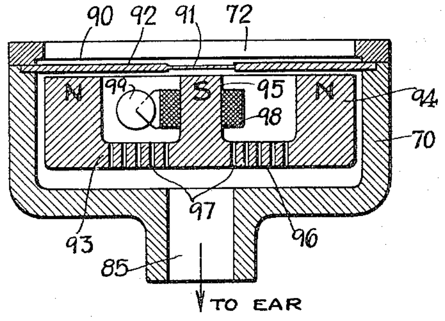
Figure 8:
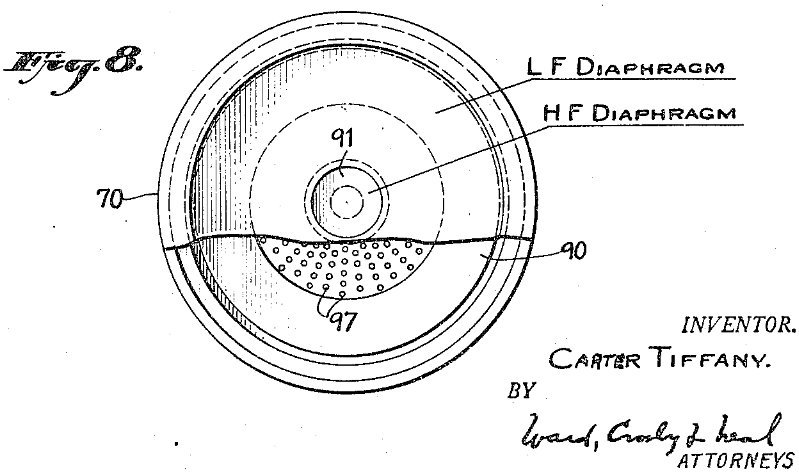

Figs. 4 to 10 inc. are views illustrating various appropriate modifications of the supersonic receiving and rectifying units, adapted to fit into the ear, for receiving and demodulating or rectifying the modulated supersonic signals emitted from the transmitting station, Fig. 4 being an axial, sectional elevation of one form of such device. Figs. 5 and 6 are, respectively, a plan view and an axial, sectional elevation of a second modification; Figs. 7 and 8 are, respectively, an axial, sectional elevation and a plan view of still another modification; while Figs. 9 and 10 are respectively, a plan view and an axial section at 10—10 of Fig. 9 of still another modification.

Referring to Fig. 1, the system of supersonic communication therein illustrated, comprises a transmitting station, shown generally at 1, and a receiving station, shown generally at 2. The transmitting station comprises an electrical oscillator 3 for generating electrical waves of supersonic frequency, i. e. upwards of 25,000 cycles per second, an acoustical pick-up, amplifying and modulating system 4, for providing amplitude-modulation of the high-frequency currents generated by the oscillator circuit 3, and a piezo-electric or equivalent type of transmitter or loud speaker 5 for broadcasting the modulated, supersonic vibrations to the receiving station 2, as indicated by the modulated supersonic waves in space 6.

More specifically the transmitting system 1 comprises a microphone pick-up device 7 connected in series with an energizing battery 8 in a circuit which includes the primary winding of an audio frequency transformer 9, and a switch 10, for opening and closing the battery circuit as desired. The secondary winding of transformer 9 is connected from the grid of an electronic amplifier tube 10 to the indirectly heated cathode thereof through a cathode bearing resistor and condenser by-passing assembly 11, the transformer side of which is grounded as shown. The plate electrode of tube 10 is in turn connected through the primary winding of a second audio-coupling transformer 12, to the positive side of a plate battery 13, the negative side of which is grounded as shown. The positive side of battery 13 is also connected to the cathode of tube 10 through a coupling condenser 14, in order to complete the audio frequency circuit. The secondary winding of transformer 12 is in turn connected from the grid of a modulator tube 15, to the indirectly heated cathode thereof through a cathode bearing resistor and by-pass condenser assembly 16, grounded on one side as shown. The plate electrode of the modulator tube 15, is in turn connected through the primary winding of an iron core coupling transformer 17, to the positive terminal of a plate battery 18 or equivalent, having its negative terminal grounded, the positive terminal of battery 18 being also connected to the cathode of tube 15 through a coupling condenser 19. The secondary winding of transformer 17 is connected through a coupling condenser 20 across a choke coil 21. The positive terminal of the plate battery 18 is connected over a conductor 22, through choke coil 21 and over a conductor 23 to the supersonic frequency oscillator circuit 3, for purposes of amplitude modulating the supersonic waves generated thereby, as explained below.

The supersonic oscillator circuit 3 which is of the tuned grid, tuned plate type, comprises an electronic triode 24, having a tuned input circuit 25, comprising a coil 26 shunted by a variable condenser 27, connected from the indirectly heated cathode of tube 24 to the grid electrode thereof through a grid blocking condenser 28, which latter, in conjunction with a grid leak resistor 29, bridged by the grid and cathode of the tube, provides the necessary grid-biasing voltage. A tuned output circuit 30, comprising the primary winding of a transformer 31, shunted by a variable condenser 32, is connected from the plate electrode of tube 24 and through a blocking or coupling condenser 33 to the cathode thereof. The resonant input and output circuits 25, 30 are tuned by means of the variable condensers 27, 32 to the supersonic or "carrier" frequency, whereby tube 24 generates sustained oscillations at this frequency, in a manner well understood. The supersonic loud speaker device 5 is connected across the secondary winding of the output transformer 31.

For amplitude modulating, in accordance with low or audio frequency signals, the sustained supersonic vibrations generated by tube 24, conductor 23, extending from the modulator circuit as explained above, is connected to the lower terminal of the primary winding of output transformer 31, as shown. The filaments of tubes 10, 15 and 24 are energized from a transformer 34 having a primary winding connected through a switch 35 to a suitable source of 60-cycle alternating current 36, said transformer having step down turns ratio secondary windings, such as 37 connected to said filaments respectively, over obvious circuits, which have been omitted for purposes of clarity in illustrating the principal feature of the circuit.

The high frequency supersonic oscillations generated by the oscillator circuit 3, may be modulated at low frequency in accordance with intelligence to be communicated, by means, for example, of a person 38 stationed at the transmitting microphone. At the receiving station 2 a recipient 39 of the intelligence thus transmitted is provided with one of the above mentioned, novel receiving and rectifying devices in accordance with the invention, adapted to fit into the recipient's ear, as indicated at 40, and as described more in detail hereinafter.

In the operation of the Fig. 1 system, the low or audio-frequency modulating components emanating from speaker 38, appear across the secondary winding of transformer 17 as an alternating current voltage the alternate half cycles of which add to or subtract from the plate voltage supplied to the supersonic oscillator tube 24 from battery 18 over circuit 22, 21, 23. In this way the supersonic carrier waves generated by oscillator circuit 3, are amplitude modulated in accordance with the intelligence impressed on the modulator by speaker 38, whereby the intelligence modulated supersonic waves 6 are broadcasted from the supersonic speaker 5.

Figures 2, 3:
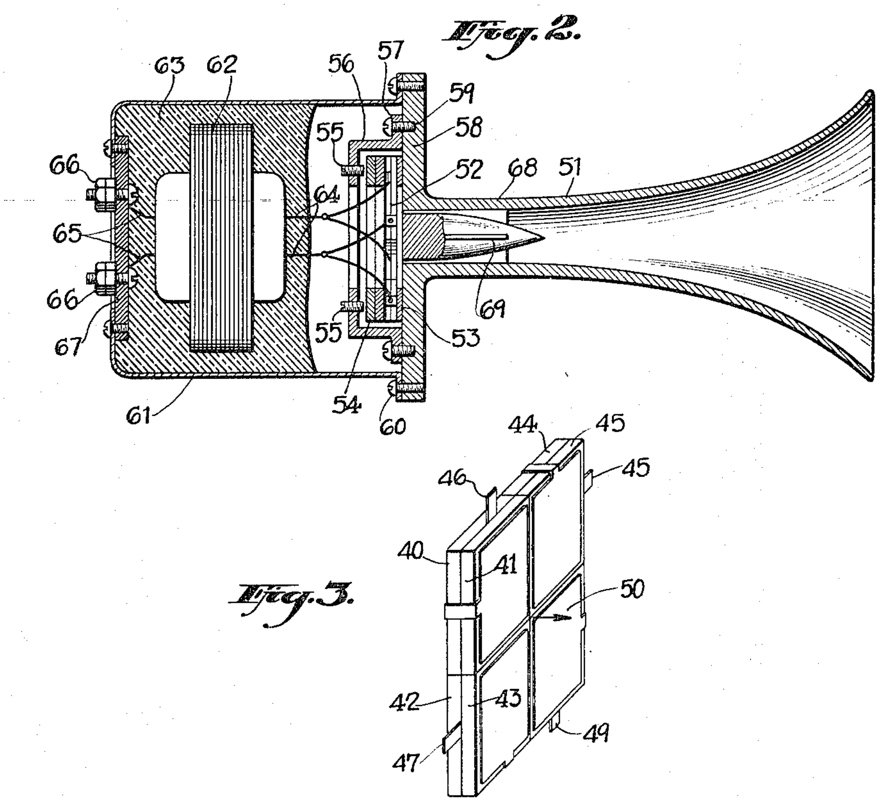

The supersonic loud speaker 5, Fig. 1, may be constructed as shown in axial section in Fig. 2 and may employ a piezo-electric crystal diaphragm, as illustrated in perspective in Fig. 3. Referring to Fig. 3, the piezo-electric crystal diaphragm may be constructed, in a manner well understood, of a series of eight rectangular, piezo-electric crystal plates, such as 40 to 45 inc., so cut from Rochelle salt crystals, for example, that their electrical axes are normal to the plane surfaces of the plates. Contiguous crystals, such as 40, 41, are cemented together in reversed relation, in consequence of which, when the diaphragm is energized with an alternating current potential applied to the diaphragm electrodes, such as 46, 47 and 48, 49, in parallel, the central portion of the diaphragm will vibrate transversely to the plane thereof, as indicated by the arrow 50, it being understood of course that the diaphragm must be rigidly clamped around its peripheral edge for this purpose.

Referring to Fig. 2, the loud-speaker structure comprises a horn 51, preferably of exponential contour, at the entrance to or throat of which is mounted the piezo-electric diaphragm 52, similar to that shown in Fig. 3, the diaphragm being spaced from the base 58 of the horn by means of an annular spacer 53, of Bakelite or other suitable material, and being held in place, in integral assembly, by means of outer clamping rings, such as 54, against which bear clamping screws, such as 55, which latter are threaded through a cup-like housing, such as 56, provided at its base with a peripheral flange 57, secured in turn to the base 58 of the horn by means of clamping screws, such as 59. Also secured to the base 58 of the horn, by means of screws, such as 60, is an outer cup-like metal housing 61 which houses an impedance-matching transformer 62, which may be embedded in a suitable sound-absorbing material, such as 63. From one winding of the transformer, suitable electrical connections 64 extend to the diaphragm electrodes, while from the other winding of the transformer, suitable connections, such as 65, extend to outer terminal lugs, such as 66, carried by an insulating member 67, secured to the outer housing 61, as shown. A bullet-shaped insert, such as 68, supported by four longitudinal fins, such as 69, is provided in the throat of the horn 51 to form the usual annular throat passage.

The supersonic receiving and rectifying unit 40 of Fig. 1 may take the form of any of the constructions illustrated in Figs. 4 to 10 inc. Referring to the construction shown in axial sectional elevation in Fig. 4, the unit comprises a substantially cylindrical housing 70, of synthetic resin or other suitable, moldable material, the housing terminating at its lower end in a restricted throat-like portion 71, adapted to fit into the ear passage of an observer. The upper opening 72 of the housing 70 is spanned by a diaphragm 73 of substantially inverted conical contour, responsive to supersonic signals, the lower end or apex 74 of which is secured to a piezo-electric crystal diaphragm 75. Diaphragm 75 comprises a pair of substantially rectangular, piezo-electric crystal plates, such as 76, 77, cut with their plane surfaces, such as 78, normal to the electric axis, and cemented together in reversed relation, and embedded in the housing 70 or otherwise rigidly clamped thereto, along one edge, as indicated at 79. Mounted within the housing below the piezo-electric crystal diaphragm is a crystal rectifier 80, such, for example, as a germanium or copper oxide crystal rectifier, etc., from which conductors 81, 82 extend to the opposite electrical terminals of the piezo-electric diaphragm 75.

In the operation of this device, modulated supersonic waves incident on the conical diaphragm 73, produce supersonic vibrations thereof, which are transmitted thereby to the piezo-electric crystal diaphragm 75. Due to the well-known piezo-electric effect of the crystal diaphragm, corresponding voltages are developed on the opposite faces of the crystal as the crystal is deformed mechanically by the action of the supersonic waves. When the diaphragm tends to move in one direction, for example, downwardly in the direction of the arrow 83, current due to the voltage developed in the crystal, follows a low resistance electrical path through the rectifier 80, and thereby tends to restrict the motion or displacement of the crystal in that direction. Conversely, when the crystal diaphragm tends to move in the opposite direction 84, under the influence of the supersonic wave motion, a voltage of opposite polarity is developed across the crystal terminals, but in this instance, owing to the unilateral action of the rectifier, a greatly reduced current flows through the rectifier, so that the motion of the crystal diaphragm in this direction is relatively free or unrestricted. This non-linear response of the crystal diaphragm 75 thus transmits to the ear of the observer, through the passage 85 of the throated portion 71 of the housing, the modulation components of the modulated supersonic waves which are incident on diaphragm 73, whereby audible indications are produced on the ear of the observer in essentially the same form as that of the original intelligence transmitted by the speaker 38, Fig. 1.

The supersonic receiving and rectifying unit, illustrated in plan view in Fig. 5 and in axial section in Fig. 6, is essentially the same in constructions and operation as that of Fig. 4, except for omission of the conical diaphragm, like elements being similarly designated in the two instances. In the Figs. 5 and 6 construction, the piezo-electric crystal diaphragm substantially spans and encloses the upper aperture 72 of the housing 70, although sufficient space is provided on all sides except at the clamped base 79, to permit free vibration of the diaphragm as indicated, for example, by the clearances 86. The receiving and rectifying action of this unit is the same as that of Fig. 4, and hence requires no further description.

The supersonic receiving and rectifying unit, illustrated in Figs. 7 and 8, differs considerably in construction and principle of operation from the piezo-electric diaphragm units of Figs. 4 to 6, inc. In the Figs. 7 and 8 construction, the outer housing 70 is the same as in the previous constructions, but in this instance the upper aperture 72 of the housing is spanned by a diaphragm 90, of magnetic material, such as sheet steel or the like. Diaphragm 90 comprises a central diaphragm portion 91 of relatively thin stock, and such as is responsive to the supersonic waves, this thin central diaphragm portion 91 being in turn welded over the central aperture of an outer and heavier annular diaphragm 92, which responds to the low-frequency modulation components of the received modulated supersonic waves. Within the housing, beneath the diaphragm 90, there is mounted a unitary permanent magnet structure 93, one pole piece of which comprises an upstanding annular flange-like portion 94, and the other pole piece of which comprises an upstanding central stud 95, the two pole piece portions being integral with a web-like, horizontal base portion 96. The base portion 96 is provided with a series of axially extending holes or perforations, such as 97, to provide air passages from the space below the diaphragm 90 to the passage 85 in the throated portion 71 of the housing, whereby vibrations of the diaphragm are transmitted to the ear drum of the observer. Surrounding the central stud 95 of the permanent magnet structure is a coil 98, the opposite terminals of which are connected to the opposite electrodes of a crystal rectifier 99 for example a copper-oxide type, as indicated, this coil being of proper impedance-matching characteristics with respect to the crystal rectifier.

In the operation of this device, a modulated supersonic signal incident on the diaphragm 90, tends to displace the small central diaphragm 91, first in one direction and then in the opposite direction, at the supersonic frequency. When the diaphragm 91 moves in one direction, for example, downwardly under this influence, the magnetic flux in pole piece 95 increases, thereby to induce a voltage in coil 98 which is impressed across the crystal rectifier, in such direction, let us assume for the moment, that the current due to the voltage thus developed follows a low resistance electrical path through the rectifier, which thereby tends to restrict the motion of diaphragm 91 in the direction assumed. When now the diaphragm 91 tends to move in the opposite direction, for example, upwardly under the influence of the supersonic wave motion, the flux in pole piece 95 decreases, thereby developing a voltage in coil 98 of opposite polarity, which thus is impressed across the crystal rectifier, in such direction now, owing to the unilateral action of the rectifier, that a greatly reduced current flows through the rectifier, in consequence of which the upward motion of diaphragm 91 is relatively free and unimpeded. This non-linear response of the small central diaphragm 91 thus transmits to the heavier outer diaphragm 90 a cumulative effect, which causes the heavier outer diaphragm 90 to vibrate in accordance with the modulation components of the modulated supersonic waves incident on the central diaphragm 91, whereby the outer diaphragm 90 vibrates at audio frequency in essentially the same form as the original intelligence transmitted. In consequence of this vibration of the outer diaphragm 90 at the modulating or audio frequency of the received modulated supersonic waves, corresponding air vibrations are transmitted from the lower surface of diaphragm 90 through the air passageways 97 in the base of the permanent magnet structure, and through the throat aperture 85 of the housing 71, to the ear drum, whereby the observer hears the audio frequency components of the received signals.

Figs. 9 and 10 illustrate a supersonic receiving and demodulating unit which requires no crystal rectifier for purposes of demodulation. This modification comprises a thin metal diaphragm 95, made for example from sufficiently thin aluminum sheet or the like, to be responsive to supersonic vibrations. Diaphragm 95 is mounted on a relatively heavy metal plate 96 of brass or the like, this plate being provided with a plurality of axially drilled air passages 97 to prevent air damping of diaphragm 95, and also for purpose of transmitting the demodulation components to the ear of the observer. The thin, supersonic diaphragm 95 is insulated from the metal plate 96 by means of an interposed insulating gasket 98. The assembly 95, 96 and 98 is mounted, about its peripheral edge, in an insulating housing 70 similar in construction and configuration to that illustrated at 70 in Figs. 4 to 8, inc., and adapted to fit into the ear cavity. Spanning the supersonic diaphragm 95, and cemented thereto, is a piezo-electric crystal unit 99, comprising a pair of substantially rectangular, piezo-electric crystal plates 100, 101, cut with their plane surfaces normal to the electric axis, and cemented together in reversed relation.

In the operation of this device, the incidence of modulated, supersonic vibrations thereon tends to cause the diaphragm 95 to vibrate in synchronism with the received supersonic waves. The consequent vibrations of diaphragm 95 in turn produce a corresponding mechanical bending or straining of the piezo-electric crystal unit 99, whereby an alternating current voltage of supersonic frequency is developed between the upper and lower faces thereof, the voltage of the lower face also appearing on the metal diaphragm 95 cemented thereto. The alternating current potential of supersonic frequency thus impressed on diaphragm 95 induces a potential of equal and opposite polarity on the metal plate 96, insulated therefrom by gasket 98, whereby diaphragm 95 is electrostatically attracted toward the metal plate 96. It will be noted that this attraction occurs irrespective of the polarity of the instantaneous potential imposed on diaphragm 95 by the received supersonic waves, that is to say, irrespective of whether or not this instantaneous potential of diaphragm 95 is positive or negative, corresponding to the alternate half-cycles of the received supersonic waves. This is due to the fact that the instantaneous potential on diaphragm 95 always induces a potential of opposite polarity on plate 96, so that diaphragm 95 is attracted toward the closely spaced, supporting metal plate 96, during both the negative and positive half-cycles of the received supersonic waves. In consequence of this action, the incidence of modulated supersonic waves on diaphragm 95 will cause the diaphragm to undergo a greater displacement in the direction of plate 96 than in the opposite direction during each cycle of the received supersonic waves, so that in addition to vibrating at the supersonic frequency, the diaphragm will be progressively displaced toward the supporting plate 96 in accordance with the modulating components thereof, whereby the modulating components are rendered audible to the observer.

I claim:

1. A device for receiving and rectifying supersonic waves modulated at audible frequencies, comprising: A substantially tubular housing adapted to fit into a human ear cavity and having a constricted passage at one end adapted to communicate with the ear passage, the opposite end of said housing being spanned by a diaphragm of magnetic material and consisting of a relatively thin central portion and a relatively heavy annular peripheral portion, said relatively thin central portion being adapted to respond to the supersonic frequency of said modulated supersonic waves, and said relatively heavy portion being adapted to respond to the audible modulating frequencies thereof, a permanent magnet disposed in said housing beneath said diaphragm, said magnet having a pole-piece thereof disposed beneath said relatively thin central portion of said diaphragm, a coil surrounding said pole-piece, and a crystal rectifier connected to said coil for impeding vibrational displacements of said diaphragm, at the supersonic frequency, more in one direction than in the opposite direction thereof, for imparting to the relatively heavy annular portion of said diaphragm a vibrational displacement in accordance with the audible modulating frequencies of said modulated supersonic waves.

2. A device for receiving and rectifying modulated supersonic waves, including in combination: a relatively heavy and rigid supporting metal plate, a relatively thin metal diaphragm, responsive to said supersonic waves, mounted substantially parallel to one surface of said metal plate, but spaced slightly therefrom and insulated therefrom, and a piezo-electric crystal element of strip-like configuration secured to the exposed surface of said diaphragm, whereby supersonic vibrations of said diaphragm mechanically distort said crystal, thereby to create instantaneous potentials of opposite polarity between said diaphragm and metal plate for causing said diaphragm to be progressively displaced toward said metal plate in accordance with the modulating components of said supersonic waves.

3. A self-contained device for receiving and rectifying modulated supersonic waves, including in combination: a relatively heavy and rigid supporting metal plate, a relatively thin metal diaphragm, responsive to said supersonic waves, mounted substantially parallel to one surface of said metal plate, but spaced slightly therefrom and insulated therefrom, and a piezo-electric crystal element, of striplike configuration, secured to one surface of said diaphragm, said piezo-electric crystal element comprising a pair of piezo-electric crystal plates, cut with their plane surfaces normal to the electric axis, and cemented together in reversed relation, whereby supersonic vibrations of said diaphragm mechanically distort said crystal, thereby to create instantaneous potentials of opposite polarity between said diaphragm and metal plate for causing said diaphragm to be progressively displaced toward said metal plate in accordance with the modulating components of said supersonic waves.

4. A self-contained device for receiving and rectifying modulated supersonic waves, including in combination: A vibratile diaphragm responsive to said waves, and means responsive to motion of said diaphragm for developing a force in opposition to one direction of motion of said diaphragm comprising a piezo-electric member, a conductor coextensive with at least a portion of said diaphragm and mounted adjacent thereto but insulated therefrom and means for electrically connecting said member to said diaphragm.

5. A self-contained device according to claim 4 wherein said member is also mechanically connected to said diaphragm.

CARTER TIFFANY.

REFERENCES CITED

The following references are of record in the file of this patent:

UNITED STATES PATENTS

| Number | Name | Date |
|---|---|---|
| 1,651,150 | Ramsey | Nov. 29, 1927 |
| 1,807,658 | Godsey | June 2, 1931 |
| 2,461,344 | Olson | Feb. 8, 1949 |